United States Patent [19]
Tull et al.

[11] 3,828,914
[45] Aug. 13, 1974

[54] ARTICLE UNSCRAMBLER
[75] Inventors: Alonzo E. Tull, Madison; Ernest J. Benson, Berkeley Heights; William V. Weiverts, Union, all of N.J.
[73] Assignee: Bentul Equipment Corporation, Berkeley Heights, N.J.
[22] Filed: Aug. 7, 1972
[21] Appl. No.: 278,296

[52] U.S. Cl............................ 198/30, 198/28, 198/29
[51] Int. Cl............................................. B65g 47/26
[58] Field of Search...... 198/28, 29, 30, 32, 220 BA

[56] References Cited
UNITED STATES PATENTS

| | | | |
|---|---|---|---|
| 1,179,383 | 4/1916 | Adderson............................ | 198/29 X |
| 1,445,899 | 2/1923 | McGregor........................... | 198/29 X |
| 1,495,610 | 5/1924 | Paridon................................ | 198/30 |
| 2,529,603 | 11/1950 | Galt................................... | 198/29 X |
| 2,753,975 | 7/1956 | Day et al. ........................... | 198/32 |
| 2,897,947 | 8/1959 | Krupp et al......................... | 198/28 |
| 3,610,396 | 10/1971 | Babunovic ........................... | 198/30 |
| 3,635,324 | 1/1972 | Burgess, Jr. .................. | 198/220 BA |
| 3,710,919 | 1/1973 | Maters................................. | 198/30 |

FOREIGN PATENTS OR APPLICATIONS
736,793  6/1966  Canada................................. 198/28

*Primary Examiner*—Richard A. Schacher
*Assistant Examiner*—Joseph E. Valenza
*Attorney, Agent, or Firm*—Stefan J. Klauber

[57] ABSTRACT

Apparatus for arranging an advancing group of randomly distributed hamburger patties or similar bodies into an aligned pattern for conveyance to a packaging station or the like. A pair of generally converging side rails are rigidly restrained at their respective end points, and each carries a deflector surface extending into the conveyance zone, which surfaces in combination, effects the required regrouping. The side rails are vibrated at a point intermediate to the restrained ends as an anti-bridging expedient. The conveying surface may be defined by a belt divided along the direction of conveyance into a central narrow sub-belt and a pair of wider flanking sub-belts, with the central belt preferably moving more rapidly than the bordering belts to aid in the aligning process.

11 Claims, 3 Drawing Figures

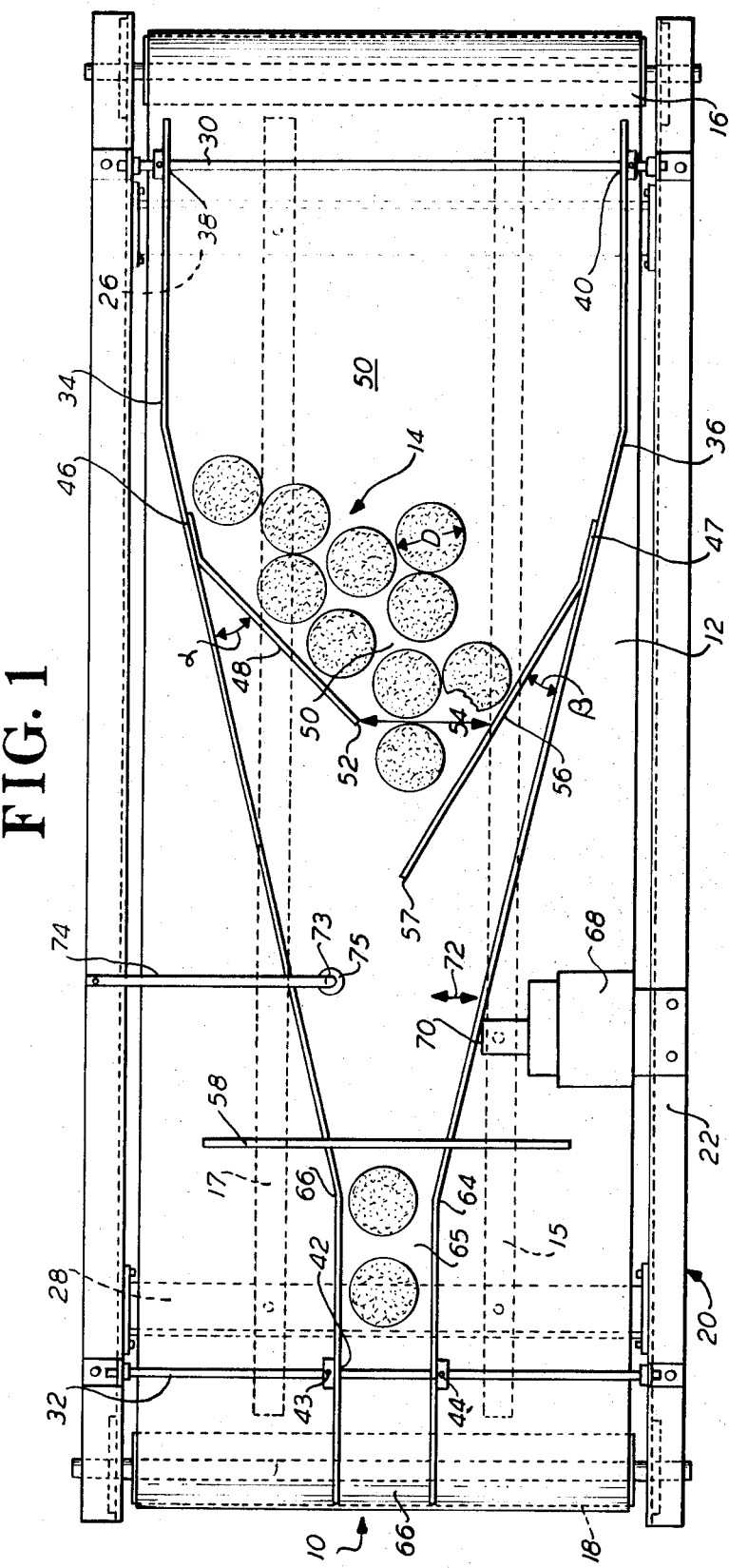
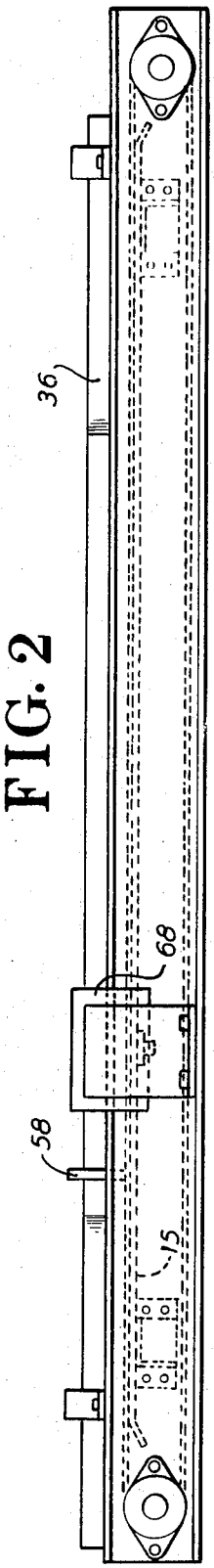
FIG.1
FIG.2

ARTICLE UNSCRAMBLER

BACKGROUND OF THE INVENTION

This invention relates generally to conveyor and packaging apparatus and more specifically relates to apparatus for aligning a randomly distributed group of articles presented thereto.

Within recent years, a vastly increased interest has been evidenced in apparatus and methodology useful in the handling and packaging of slab-like comestibles, including meat products such as hamburger patties, flat, slab-like steaks, and similar discrete servings of meat, and including as well analogously shaped food products such as sandwiches, cakes, or other items. In a given instance, one may seek, for example, to so package the said comestibles as to provide a finished product suitable for vending in retail outlets; or similarly, one may be interested in providing a package for use by high-volume restaurants or the like. It may be noted in this connection that in the past, the packaging of comestibles of this type has largely been effected by manual techniques, a practice which has become increasingly unacceptable, due not only to the unsanitary aspects of these manual operations, but moreover to the ever-increasing cost of labor. Manual techniques are also undesirable in that they tend to make quality control inspection difficult.

In those instances where it is desired to thus apply automated technology to the packaging of comestibles of the types cited, a primary requirement is that of providing the handling and packaging machinery with a stream of discrete articles upon which the highly organized mechanisms may effectively operate. This operation is generally known in the packaging art under the term of "unscrambling". In such connection, it may be noted that many schemes have over the years been used for achieving unscrambling of articles such as cans or the like, which are sought to be aligned from random grouping for purposes of packaging in cases, for example. Such prior techniques have used numerous unscrambling schemes, including vibrating tables, and guide rails which may be displaced between alternate positions, for example, to divert advancing products into desired channels, and in some instances—to prevent bridging. By and large, these prior mechanisms have not proved satisfactory for the present application. This is possibly due to the fact that the relatively flat products treated by the instant invention, present in relation to the size of individual articles, a comparatively high contact area with the conveying surface, in consequence of which the usual anti-bridging techniques appear to be relatively ineffective.

In accordance with the foregoing, it may be regarded as an object of the present invention to provide apparatus which is particularly effective in rearranging an advancing group of randomly distributed hamburger patties or similar flattened articles into an aligned pattern for conveyance to a further processing station or the like.

It is a further object of the present invention, to provide an article unscrambler appropriate for use with conveyed flat products, such as comestibles, which is of simple and dependable operation, and which incorporates highly effective means for preventing bridging among the articles during the aligning operation.

It is a still further object of the present invention to provide apparatus for aligning a conveyed group of relatively flat products, such as for example, hamburger patties, which apparatus not only includes features preventing lateral bridging among the products, but also includes means eliminating vertical overlap among the products, in consequence of which the output from the apparatus comprises a serial stream of aligned and discrete articles, such stream being appropriate for packaging or related operations.

SUMMARY OF INVENTION

Now, in accordance with the present invention, the foregoing objects, and others as will become apparent in the course of the ensuing specification, are achieved in apparatus, wherein a pair of generally converging side rails are positioned atop a conveying surface for the randomly arranged articles entering the aligning apparatus. Each of the said rails is rigidly restrained at its end points. Toward the input end of the apparatus, one rail carries a grouping arm which projects inwardly toward the zone of conveyance to group the advancing articles, which thereupon impinge on a downstream positioned arm projecting from the second rail into the conveyance zone. The second arm effectively acts as an aligning guide with individual articles passing from the end of such arm at approximately aligned positions. The side rails are secured to one another, so that they are constrained to move together, and relatively high-frequency vibration is applied at the rails and the aforementioned arms by contact between rails and a vibrating head which contacts at least one of the said rails at a point intermediate to the restrained ends of the rail. Such vibration acts as an anti-bridging expedient. A knock-off bar preferably passes over the rails at the converging throat of the apparatus, the said bar acting to push the uppermost of overlapping articles from one another, thereby eliminating the possibility of overlapping or coincident articles from advancing through the apparatus and to downstream stations such as packaging operations or so forth.

In one embodiment of the invention, the conveying surface may be defined by a belt which is divided along the direction of conveyance into a central narrow sub-belt and a pair of sub-belts flanking the central element. The central sub-belt is preferably driven at a more rapid rate than are the bordering elements, the combination acting to promote alignment of the conveyed objects.

BRIEF DESCRIPTION OF DRAWINGS

The invention is diagrammatically illustrated, by way of example, in the drawings appended hereto, in which:

FIG. 1 is a plan view of an aligning apparatus in accordance with the present invention;

FIG. 2 is a side elevational view of the FIG. 1 apparatus; and

DESCRIPTION OF PREFERRED EMBODIMENT

Figure 3:
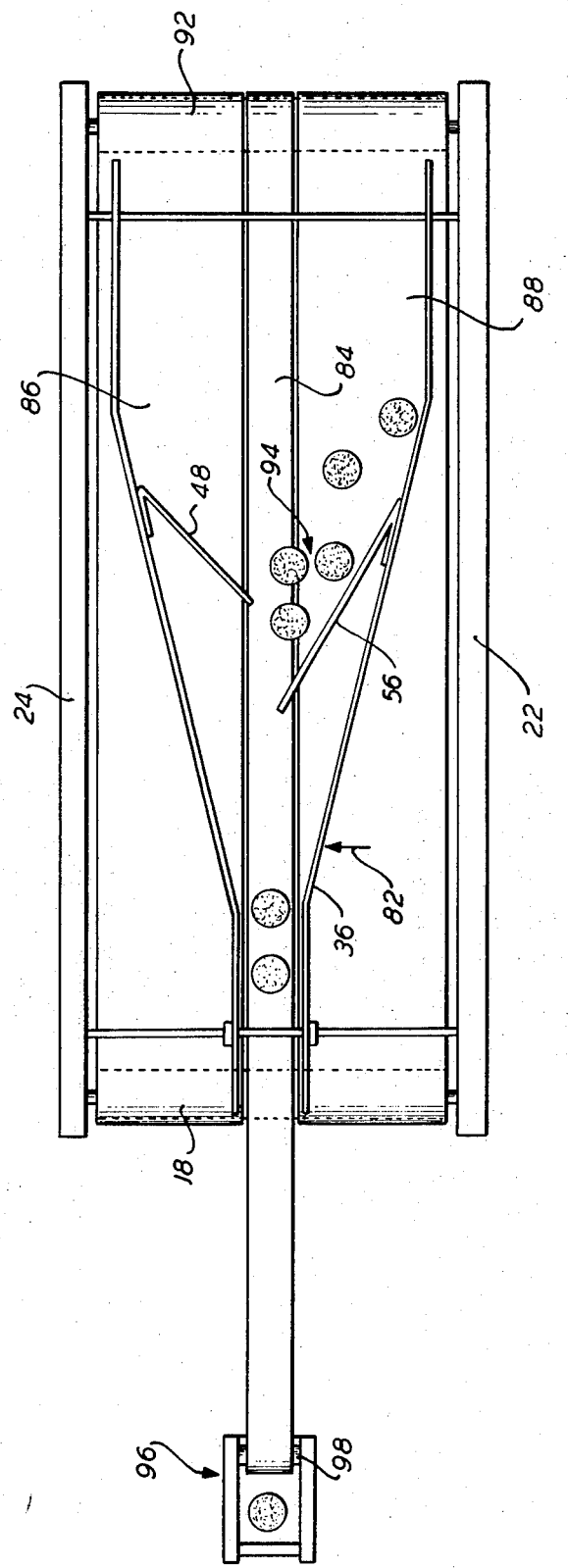
FIG. 3 is a schematic plan view of apparatus similar to that of FIG. 1, but incorporates parallel, moving sub-belts.

In FIGS. 1 and 2 herein, plan and side elevational views respectively appear of unscrambling apparatus 10 in accordance with the present invention. The apparatus 10 shown, will generally form part of a packaging operation for slab-like comestibles, such as meat patties or other relatively flat but not necessarily round products. The incoming products enter onto the conveying belt 12 of apparatus 10 from the right side of the figure, such products originating, for example, at a forming and/or slicing device, which may provide in a typical instance, individual hamburger patties. A group 14 of such patties, consisting of randomly arranged articles, is thus seen to be advancing upon conveyor belt 12, from right to left in the sense of the Figure.

Conveyor belt 12 is seen at opposite ends of the apparatus to pass about rollers 16 and 18, one of which may be driven from any convenient power source. The apparatus 10, is supported on a frame generally designated at 20, which frame includes longitudinal side members 22 and 24, as well as frame cross members 26 and 28. The frame 20 also includes vertical support members (not shown), which extend to the floor and support the conveying surface in spaced relationship from the floor. The belt 12 is supported intermediate rollers 16 and 18 by longitudinal support members 15 and 17 extending between cross members 26 and 28. At respectively opposite ends of apparatus 10, cross pieces 30 and 32 are provided, which are anchored at their opposing ends in longitudinal frame members 22 and 24.

Cross pieces 30 and 32 extend above the plane of conveying belt 12, and serve to support a pair of converging rails 34, 36, which are typically relatively flat members, extending of the order of one inch in vertical dimension. The said converging rails are rigidly connected to cross pieces 30 and 32 at their attachment points 38, 40, 42 and 44. Typically, they are connected through a set screw 43 or other adjustable means, which while thus providing the said fixed connection, also provides that by loosening the said screw, the said rails 34, 36 may be spaced with respect to one another at variable distances, thereby enabling accommodation of apparatus 10 to varying sized articles.

Converging rail 34 is seen to have secured thereto at a point 46 spaced from the input end of the apparatus, a grouping arm 48 which extends obliquely into the path of article conveyance to a point almost half-way across the width of the conveyance zone 50 at such point. The distance 54 between the terminal end 52 of arm 48 and an ordering arm 56 extending from rail 36 is preferably slightly less than 2D, where D represents the approximate diameter of a paddy or other object of similar shape advancing in the conveyance zone 50. The basic function of arm 48 is to provide a guide surface in the conveyance zone, such that the randomly arranged patties 14 are grouped in relatively tight fashion, as such patties advance beyond point 52. Specifically, in view of the cited distance 54 between point 52 and rail 36, it will be clear that but a single patty at a time may pass beyond point 52. Also, it will be clear that as the distance 54 is slightly less than 2D, bridging difficulties are not likely to in any event occur at the constricted space between arms 48 and 56, a possibility which is further minimized by the mechanism to be hereinafter discussed.

The ordering arm 56, like arm 48, extends obliquely into the path of conveyance, from a point 47 approximately lateral with point 46. Arm 56 is considerably longer than arm 48, and as the angle $\beta$ between it and converging rail 36 is smaller than the angle $\alpha$ between arm 48 and converging rail 34, patties passing beyond point 52—which are then ordered in terms of their advance —, are further and gently guided to a midstream position on belt 12. During the course of impinging against the surfaces of arms 48 and 56, due to the continuing motion of the conveying belt 12 as well as to the vibrant condition of rails 34 and 36 as will be hereinafter discussed, the patties promptly sweep along such surfaces so that when they are injected back at the approximate centerpoint of the conveying belt, beyond the end point 57 of arm 56, the said patties now advance in almost aligned positions.

The patties thereafter, in their continued path of progression, pass beneath a knock-down bar 58 which is secured to rails 34 and 36, as for example by slots formed in the bar. The lower edge of knock-down bar 58 is spaced from the conveying belt 12 by a distance slightly greater than the thickness of any one patty, the function of such bar being to impinge against any additional patties that may lie atop an individual advancing patty, whereby the overlying patty will be knocked off from the underlying so that but a single patty at a time progresses beyond the said knock-down bar. The rails 34 and 36 reach their maximum convergence at point 64, 66, and from such point onward toward the output of the apparatus are parallel and define a constricted throat 65. The distance between the rails in the throat zone 65 is somewhat greater than the distance D representing the diameter of a single patty. In consequence, but a single patty at a time may pass through the throat zone 65, so that as such patties emerge from end 66 of apparatus 10, they are accurately aligned, and of course, in serial order.

Typically, the products now emerging in serial aligned condition, are passed onto a conveyor belt for delivery to other stations forming part of a packaging system, as for example, a wrapping or other processing station.

It will be observed in FIG. 2, that between the point 57 and knock-down bar 58, a cylindrical guide post is provided. The post includes a central pin 73 supported in overhead fashion from an arm 74 secured to frame member 24. An elongated roller 75 is mounted on pin 73, the unseen (bottom) end of the roller extending to, but being spaced slightly from, the conveyor belt surface. Roller 75 is freely rotatable about pin 73. The guide post is particularly useful where elongated (as opposed to rounded) objects are conveyed by the present apparatus. In such instance, the guide post, by intercepting the edge of an axially misaligned object, allows the object to roll about it as it advances on the conveyor belt—the object thereby being aligned with the longitudinal axis of the apparatus 10.

In accordance with a preferred aspect of the present invention, it will be observed that the converging rails 34 and 36 are each rigidly restrained adjacent their respective ends, namely at points 38, 40, 42 and 44. In the case of each such rail, it is seen that between the restraining end points, the rail is unrestrained, except of course to the extent that a degree of contact may be present at the lower rail edge and the underlying conveyor from time to time due to irregularities in the conveyor or so forth.

Typical products conveyed upon the instant apparatus may, as has been previously indicated, comprise meat patties or other relatively flat comestibles. In the bulk of instances, these products will be relatively hard in nature in that commonly, they will be in a frozen or semi-frozen condition—notwithstanding that in their fresh condition, they would lack rigidity. Even in the frozen condition, however, a principle problem in aligning flattened large products of this type is the tendency of such products to bridge at various points in the apparatus. In the present instance, such tendency is completely eliminated by combining with the specific form and arrangement of guide surfaces, means to vibrate the entire assembly of guide surfaces at a relatively high rate of oscillation.

As is thus seen in FIG. 1, a vibratory means generally indicated at 68, is mounted upon one of the side rails 22 with the tip 70 thereof closely adjacent the said rail. Means 68 may comprise a rotating cam-actuated device, but preferably comprises an electromechanical transducer or an air pressure actuated vibrator. All of these vibrators are commercially available items of conventional design. Numerous electromechanical transducers of the piezoelectric or electromagnetic type are, for example, available for use in the present application.

The tip 70 of means 68 undergoes relatively high frequency excursions in the to and fro direction indicated in FIG. 1 by arrow 72 adjacent said tip. The extent and frequency of such excursions is a function of the particular transducer or other vibratory means utilized. In the course of undergoing such vibratory excursions, the said tip repeatedly contacts the adjacent wall of the guide wall 64, in consequence of which the guide rail sympathetically vibrates with the said vibrating tip 70. Since, furthermore, the rail 64 is connected in relatively rigid fashion to the opposite guide rail 66 through the cross pieces 30 and 32, it will be clear that the entire frame consisting of both said side rails, of the cross pieces, and as well the arms 48 and 56 secured to the rails, will similarly be vibrated at the approximate vibratory frequency of tip 70. In consequence of this arrangement, a continuous, low amplitude, and relatively high frequency vibration is introduced into the entire array of guide surfaces. Such arrangement has been found to provide an extremely effective anti-bridging expedient, preventing the occurrence of bridging among the various patties as they pass proximate to the said guide surfaces. Such vibration acts as well to disrupt such bridging as may occur, and furthermore facilitates passage of the patties along the guide surfaces.

In the foregoing connection, it is important to observe that the vibratory means 68 is coupled to the rail 65 at a point along its length between the rigidly restrained ends thereof. Because the ends of the rail are thus restrained, the rail is relatively inflexible at the point of force application. In consequence, the rail at such point is able to accurately follow the excursions of the vibrating tip, whereby the entire guide surfaces of the apparatus undergo excursions closely approximating the frequency and amplitudes of the transducer or other means utilized. In other words, the said surfaces undergo true vibratory motions in accordance with the movement of tip 70. This contrasts to the relatively ineffective vibration of the guide surfaces which is achieved in those instances where forces are applied to cantilevered arms or the like, in which cases, the guide surfaces are unable to accurately follow the excursions of the member providing the forces in question.

While, as has been indicated, electromechanical vibrating transducers are particularly effective for the instant application, in view of their rapid vibratory rate and accurately controllable degree of excursion, cam-like or other mechanical and/or air arrangements may also be utilized for effectively providing the excursion of an element corresponding to the tip 70 of FIG. 1, in the back and forth directions indicated by arrow 72.

In FIG. 3, a plan view appears of a further embodiment of apparatus in accordance with the invention. In most respects, apparatus 80 shown therein is similar to apparatus 10 described in connection with FIGS. 1 and 2, and the showing of FIG. 3 is therefore simplified and largely schematic; for example, the vibratory means 68 is not explicitly shown, although it will normally be secured to member 24 (as has been discussed in connection with FIGS. 1 and 2) so that a vibrating force is provided to rail 36 at a point such as that at the tip of arrow 82. Similarly, knock-down bar 58 and the assembly including roller 75 are, for purposes of simplicity, not shown in FIG. 3.

The conveying surface of apparatus 80 consists of three parallel moving sub-belts, namely a relatively narrow central sub-belt 84, and a pair of relatively wide flanking belts 86 and 88. The three sub-belts at the input end of apparatus 80 pass about a roller 92. This roller may have an enlarged or diminished central portion, or other means such as a separate drive may be used, so that the central sub-belt 84 may be driven at a speed differing from that of the flanking sub-belts 86 and 88. In consequence of such arrangement, it will be appreciated that grouped objects, such as, for example, the several patties at 94, are drawn away from one another in the direction of conveyance, so that aligning thereof is expedited as the several objects traverse past arms 48 and 56. In accordance with the preferred mode of practicing the present invention, the desired effect is best achieved where the central sub-belt is driven at a higher speed than the adjoining sub-belts.

As the conveyed objects reach the output end 66 of apparatus 80, they are thus aligned upon and carried only by the central sub-belt 84. In accordance with a further aspect of this embodiment of the invention, the sub-belt 84 may extend beyond the end of the unscrambling station, whereby it may serve as a means to convey the aligned objects to a successive station or to a point of manual pick-off. Thus, as shown, sub-belt 84, unlike sub-belts 86 and 88 which pass about roller 18, may extend to a means 96 where it may pass about a roller 98. It will be appreciated that this advantage of the central sub-belt 84 does not derive from a requirement that sub-belt 84 be driven at a speed differing from the bordering sub-belts, and that for such an application the central element can be driven at the same speed as its neighbors. In a typical instance, for example, means 96 may comprise a dropper mechanism forming part of a station for shingling patties or the like onto packaging trays. This further station does not per se form part of the present invention, and hence is not set forth in any detail.

While the present invention has been particularly set forth in terms of specific embodiments thereof, it will be understood in view of the present disclosure, that numerous variations upon the invention are now enabled to those skilled in the art, which variations yet reside within the scope of the instant teaching. It will, for example, be apparent that the present apparatus, while particularly adapted for operations with comestibles, can be utilized with other relatively flat products—as, for example, hardware such as washers or the like. Ac-

We claim:

1. Apparatus for aligning a randomly distributed group of slab-like objects presented thereto, comprising in combination:

a support frame;

a movable conveying surface at said frame and including an input end for accepting said randomly distributed group and an output end for providing aligned articles for subsequent processing thereof;

a pair of generally converging side rails mounted in overlying relationship to said conveying surface, and extending in the direction of conveyance, said rails converging toward the output end of said apparatus into a restricted throat permitting passage of but a single article at a time, each of said rails being rigidly restrained at the opposite ends thereof and including a rigidly connected deflecting arm extending inwardly from said respective rail toward the center of the zone of conveyance and into the path of conveyance of said objects, closely adjacent to said conveying surface, said arms grouping said advancing, randomly distributed articles for presentation to the converged portion of said rails; and means to vibrate the guiding surfaces of said guide rails and said deflecting arms substantially along the entire length thereof, said means comprising a vibrating member contacting at least one of said rails intermediate the restrained ends thereof, and said rails being rigidly coupled to one another, whereby vibrations coupled to one of said rails from said vibrating member vibrates both said rails and said rigidly connected deflecting arms.

2. Apparatus in accordance with claim 1, wherein said side rails converge symetrically, and wherein the first of said deflecting arms is at an acute angle in the downstream direction with respect to the rail to which said first arm is secured, which angle is greater than the acute angle between the second said arm and the rail to which it is secured; the second said arm being longer than the first said arm whereby the end thereof extends in a downstream direction beyond the end point of said first arm; the distance between the end point of said first arm and said second arm defining a conveyance passage less than the average lateral extent of two of said articles; whereby the advancing, randomly distributed group is deflected off the said first arm, thence onto said second arm and through said passage, emerging toward the centerpoint of said conveying surface in an approximately ordered basis.

3. Apparatus in accordance with claim 2 wherein said vibrating means comprises an electromechanical transducer including a vibrating tip which undergoes excursions generally transverse to the direction of conveyance, said tip being positioned for mechanical coupling with the said side rail.

4. Apparatus in accordance with claim 2 further including a knock-down bar positioned across said guide rails adjacent the throat portion thereof, said knock-down bar being spaced from said underlying conveying surface a distance such as to enable but a single flat article at a time to pass therebeneath, thereby serving to knock off overlying articles from single articles passing therebeneath.

5. Apparatus in accordance with claim 2, further including a cylindrical guide positioned in overlying relationship to said conveying surface and oriented at right angles with respect to said surface at a position between said deflecting arms and said throat portions; said guide being laterally displaced from the longitudinal axis of said conveying surface, whereby oblong articles advancing on said conveying surface may impinge upon said guide and be rotated thereabout in the course of conveyance, thereby aligning such objects with their axes oriented toward the direction of conveyance.

6. Apparatus in accordance with claim 2 wherein said side rails are constrained at their end points by securing said rails to a pair of cross pieces extending between side members of said frame at longitudinal positions proximate the input and output ends of the said apparatus.

7. Apparatus in accordance with claim 6, wherein said rails are secured to said cross pieces through set screws, whereby the spacing between said rails may be adjusted.

8. Apparatus in accordance with claim 1 wherein said conveying surface comprises a conveying belt defined by a relatively narrow central sub-belt and a pair of separate parallel flanking sub-belts.

9. Apparatus in accordance with claim 8, wherein said central sub-belt extends in the direction of conveyance beyond the ends of said adjacent sub-belts, said rails and said support frame, whereby said aligned objects may be readily conveyed to a successive station or a pick-off point.

10. Apparatus in accordance with claim 8, further including means for driving said central sub-belt at a different speed than said flanking sub-belts, whereby aligning of said objects on said central sub-belt is facilitated.

11. Apparatus in accordance with claim 10, wherein said means is adapted to drive said sub-belt at a speed higher than said adjacent sub-belts.

* * * * *